(12) United States Patent
Ho

(10) Patent No.: US 9,049,842 B2
(45) Date of Patent: Jun. 9, 2015

(54) AUTO WATER REPLENISHING MECHANISM OF THE PET DRINKING FOUNTAIN

(71) Applicant: Chia-Wen Ho, Changhua (TW)

(72) Inventor: Chia-Wen Ho, Changhua (TW)

(*) Notice: Subject to any disclaimer, the term of this patent is extended or adjusted under 35 U.S.C. 154(b) by 41 days.

(21) Appl. No.: 13/958,027

(22) Filed: Aug. 2, 2013

(65) Prior Publication Data

US 2014/0076242 A1    Mar. 20, 2014

(30) Foreign Application Priority Data

Sep. 18, 2012  (TW) .............................. 101134097 A

(51) Int. Cl.
*A01K 7/04* (2006.01)
*A01K 39/024* (2006.01)

(52) U.S. Cl.
CPC .................. *A01K 7/04* (2013.01); *A01K 39/024* (2013.01)

(58) Field of Classification Search
CPC ................................ A01K 39/024; A01K 7/04
USPC ......................... 119/74, 75, 78, 79, 80, 72.5
IPC ............................................. A01K 7/04, 39/024
See application file for complete search history.

(56) References Cited

U.S. PATENT DOCUMENTS

| | | | | |
|---|---|---|---|---|
| 1,328,036 A * | 1/1920 | Drew | ............................... | 119/74 |
| 1,548,720 A * | 8/1925 | Lewis | ............................... | 119/78 |
| 1,811,375 A * | 6/1931 | Wysong | ........................ | 119/72.5 |
| 2,079,412 A * | 5/1937 | Justus | ............................ | 137/195 |
| 2,671,464 A * | 3/1954 | Mabbs | .......................... | 137/111 |
| 2,781,772 A * | 2/1957 | Russell | ......................... | 137/411 |
| 3,145,729 A * | 8/1964 | Cordis | .......................... | 137/414 |
| 3,893,475 A * | 7/1975 | Hudson | ........................ | 137/414 |
| 5,099,798 A * | 3/1992 | Ohara | ............................. | 119/80 |
| 6,332,428 B1 * | 12/2001 | Li et al. | ........................... | 119/75 |
| 6,332,475 B1 * | 12/2001 | Brougham | .................... | 137/414 |

FOREIGN PATENT DOCUMENTS

| | | | | | |
|---|---|---|---|---|---|
| GB | 2118014 A | * | 10/1983 | ............... | A01K 7/04 |
| GB | 2317806 A | * | 4/1998 | ............... | A01K 7/04 |
| JP | 06319400 A | * | 11/1994 | ............... | A01K 9/00 |

* cited by examiner

*Primary Examiner* — Shadi Baniani
(74) *Attorney, Agent, or Firm* — Muncy, Geissler, Olds & Lowe, P.C.

(57) ABSTRACT

An automatic replenishing mechanism for a pet drinking fountain is a container having a water injection element, a float, a linkage set, and a sealing plug. The water injection element, connected to the container, has a water inlet and a base. The float, connected by a link bar to the base, is located underneath the water inlet and limited by a guiding portion to float longitudinally. The sealing plug is mounted on the link bar near the water inlet. When water level rises to elevate the float, the link bar rotates to push the sealing plug. When the float floats to a predetermined level, the sealing plug blocks the water inlet to stop water supply. When a pet drinks water and the water level drops, the float sinks from the predetermined level. The link bar rotates to retreat the sealing plug from the water inlet, thereby automatically replenishing water.

1 Claim, 12 Drawing Sheets

AUTO WATER REPLENISHING MECHANISM OF THE PET DRINKING FOUNTAIN

BACKGROUND OF THE INVENTION

1. Field of Invention

The invention relates to a pet drinking fountain and, in particular, to an auto water replenishing mechanism of the pet drinking fountain.

2. Related Art

In addition to feeding food, one also needs to supply water for his pet. Traditionally, pet drinking water supply is usually a simple container filled with water. The container can be either closed or open. The size and shape of the container also vary from pet to pet. Such containers simply hold water. On the market, there starts to have containers with cycling water. They mainly utilize a pump to yank up pressure, thereby facilitating dynamical circulation of water. Many pet owners think that such water is good for their pets. However, regardless of what type of container, the pet owner has to take notice when water level is low and resupply the water. Otherwise, the pet will be short of drinking water. Those with pump circulation will further face the problem that the pump motor may fail because of the water shortage.

FIG. 12 shows a pet drinking fountain that can automatically replenish water. Its structure mainly has a water injection element 91 on the container 90 thereof. During water supply, water is injected into the container 90 by a water inlet 910. The water injection element is pivotally provided with a horizontal swing arm 92, whose end is connected with a float 93. The swing arm 92 urges against a sealing plug 94 in the water injection element. The float 93 swings with respect to the pivotal point of the swing arm 92 on the water injection element. When the water level rises, the float rises and drives the swing arm to push the sealing plug 94 to block water inlet 910. When the float drops, the sealing plug 94 retreats from the water inlet 910.

However, the above-mentioned pet drinking fountain with automatic water replenishment has the following problems:

1. The swing arm 92 must have a certain length, so that the swing arm 92 can push the sealing plug 94 to block the water inlet 910 as the float 93 rises with the water level according to the lever principle. Thus, the size of container must be larger than the extended length of the swing arm 92 and the float 93. It is then difficult to reduce the size. Therefore, it is usually used in larger pet drinking fountains. Small pet drinking fountains do not enjoy the function of automatic water replenishment.

2. Since water sources in different regions have different pressures, floats 93 of the same size and swing arm 92 of the same length may have different pushing forces on the sealing plug 94 during the process of replenishing water in the container 90. In a region with larger water pressure, the water inlet may not be completely blocked, resulting in failure of automatic water replenishment.

Therefore, it is the goal of the invention to solve the above-mentioned problems in conventional pet drinking fountains.

SUMMARY OF THE INVENTION

Objects

An objective of the invention is to provide an auto water replenishing mechanism for pet drinking fountains. It is disposed in a container filled with water for a pet to drink. Through a careful design, the space required for the float and the link bar is reduced so that only a small container is needed to accommodate the float and the link bar. Therefore, the invention can be used in a small pet drinking fountain to provide the function of automatic water replenishment. Besides, a linkage set is employed between the float and the sealing plug to overcome the problem due to regions with different water pressures. When water is injected from a source with a larger pressure, the linkage set provides the sealing plug with sufficient resistance to completely block the incoming water. This prevents the sealing plug from failure.

To achieve the above-mentioned objective, the invention includes:

a water injection element connected to a container and exposed from a water outlet connected to a water source, and having a water inlet for injecting water into the container and a base;

a float disposed under the water inlet of the water injection element and limited by a guiding portion to float longitudinally on water;

a linkage set composed of at least two link bars pivotally connected on two ends and linking between the base and the float; and a sealing plug mounted on the link bar in the vicinity of the water inlet of the water injection element;

wherein when water level rises, the float floats to swing the link bar and drive the sealing plug; when the float floats to a predetermined level, the sealing plug is driven to block the water inlet, preventing water from further flowing into the container; when a pet drinks water and lowers the water level, the float sinks from the predetermined level to swing the link bar and retreat the sealing plug from the water inlet, thereby automatically replenishing water.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
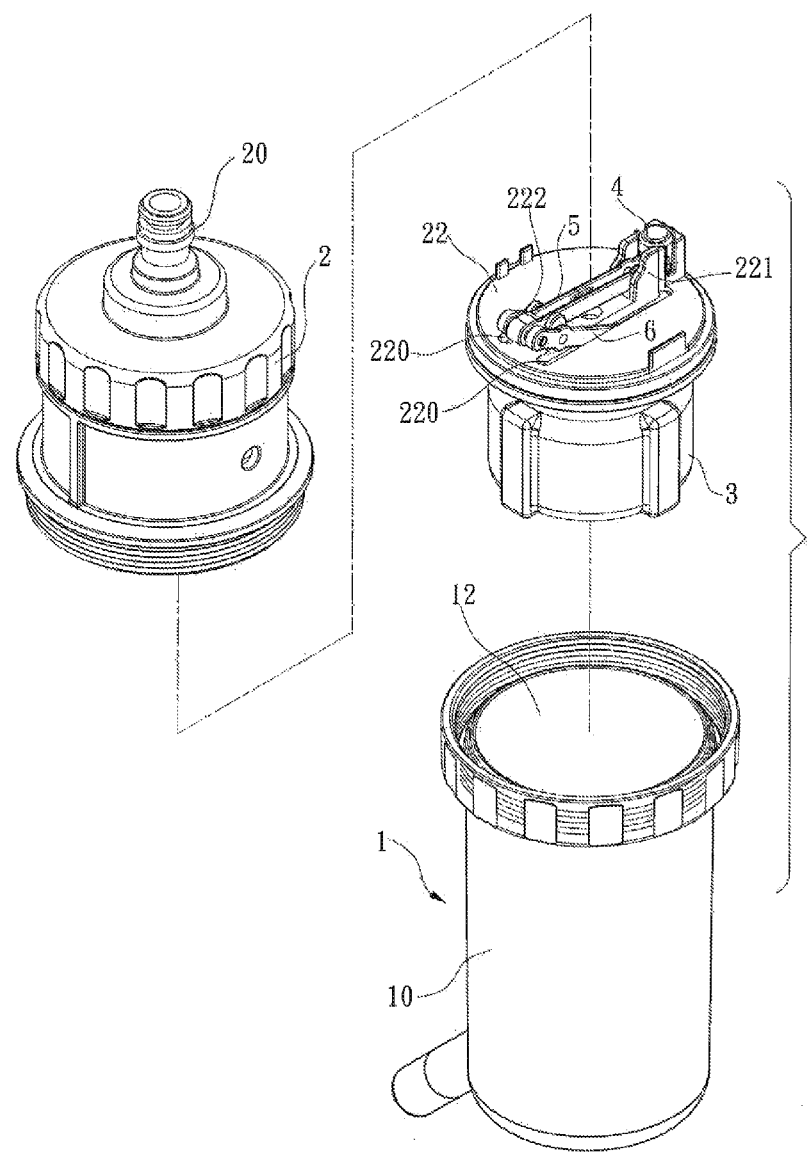
FIG. 1 is a three-dimensional view of the first embodiment of the invention, showing the base, the float, the sealing plug, and the linkage set of the auto water replenishing mechanism.

This embodiment of the invention provides an auto water replenishing mechanism for a pet drinking fountain. As shown in FIG. 1, it is installed in a container 1. The container 1 in this embodiment is a small cup. The disclosed auto water replenishing mechanism includes a water injection element 2, a float 3, a sealing plug 4, and a linkage set.

Figure 2:
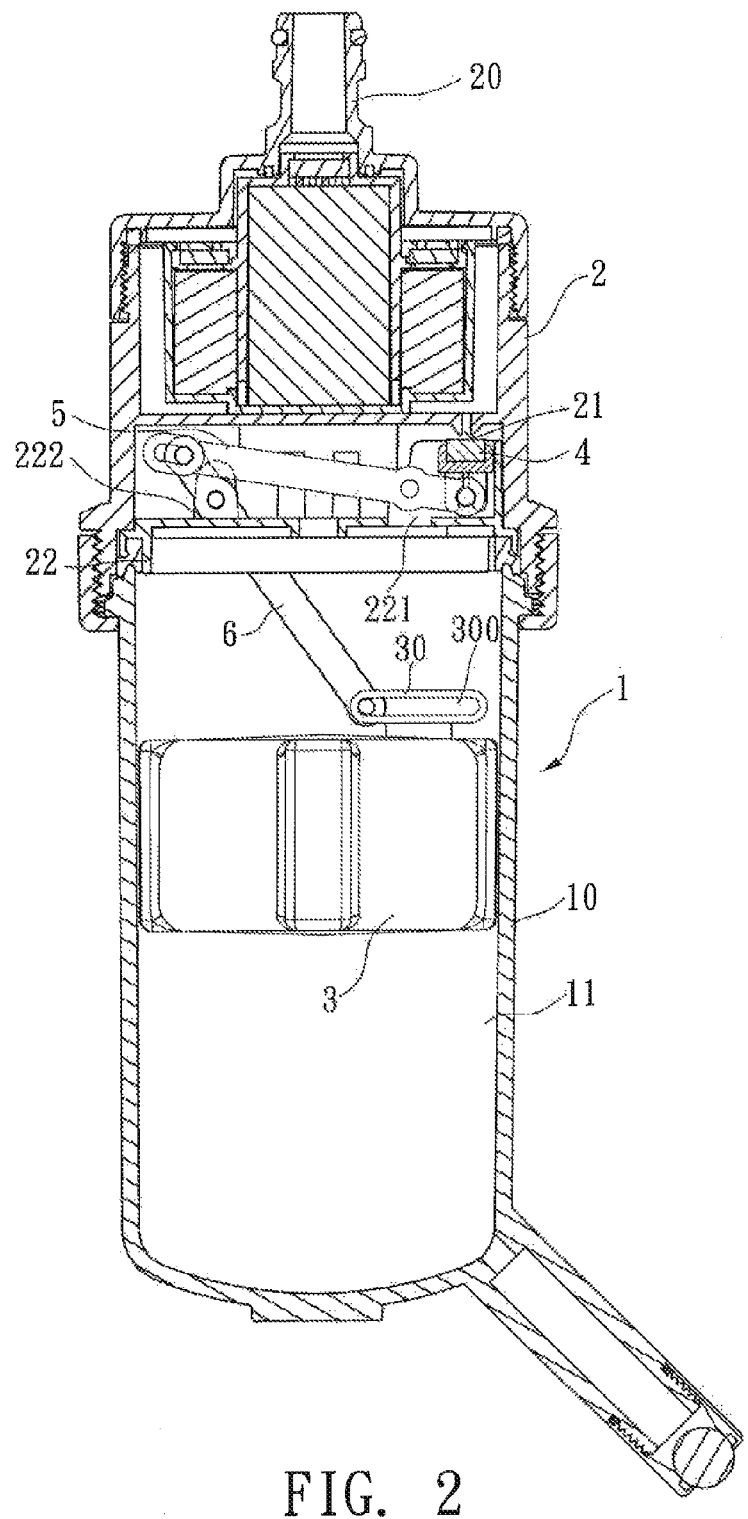
FIG. 2 is a schematic cross-sectional view of the auto water replenishing mechanism in the first embodiment, showing that the sealing plug retreats from the water inlet for water replenishment as the float drops.
Figure 3:
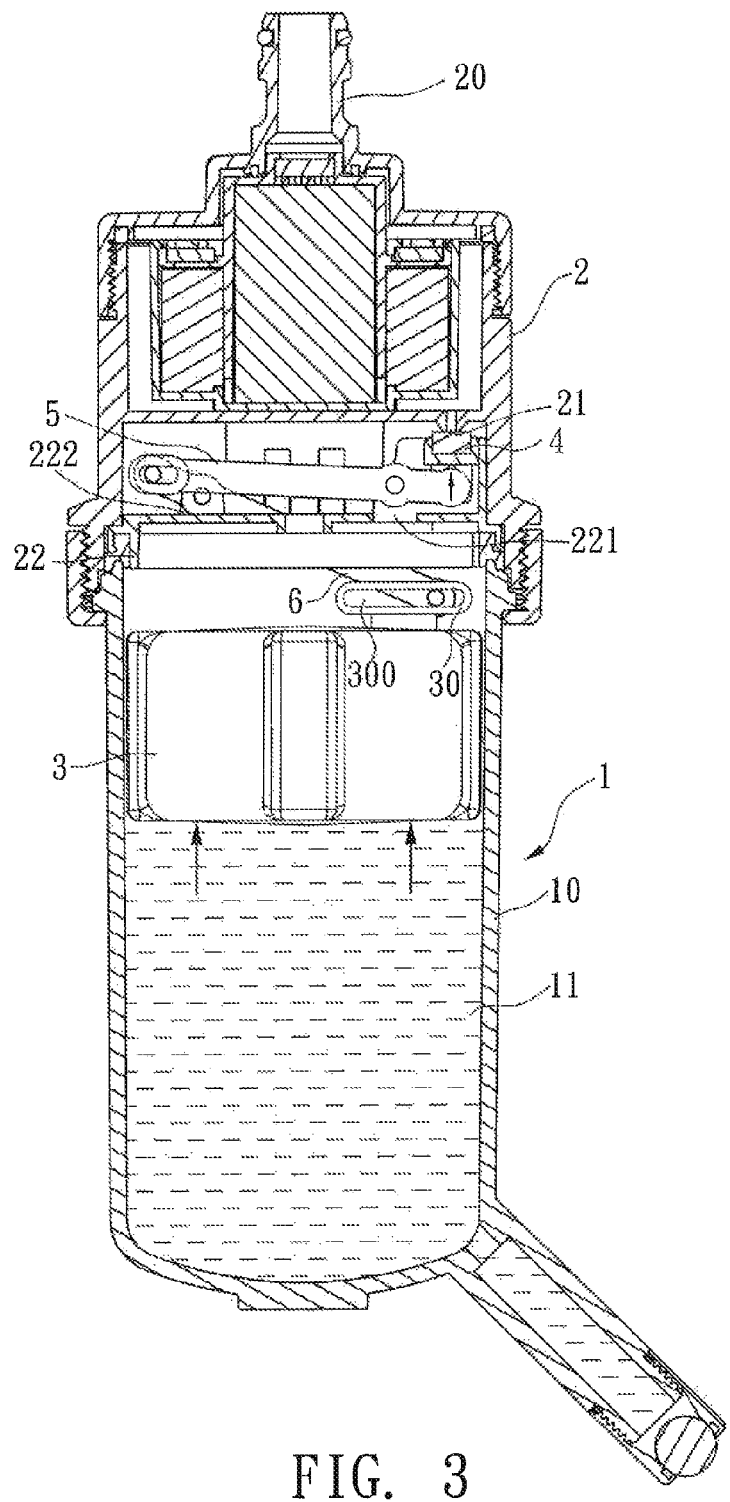
FIG. 3 is a schematic cross-sectional view of the auto water replenishing mechanism in the first embodiment, showing that the sealing plug blocks the water inlet as the float rises.

As shown in FIGS. 2 and 3, the container 1 has a surrounding wall 10 that encloses a chamber 11. The chamber 11 has an upward opening 12 on the surrounding wall 10. The water injection element 2 is disposed at the opening 12 of the surrounding wall 10.

As shown in FIGS. 2 and 3, the water injection element 2 has a water outlet 20 and a water inlet 21 and a base 22. The base 22 in this embodiment can be separated from the water injection element 2. The base 22 has two long holes 220 opened on two opposite sides. One end of the long holes has a first pivotal connection part 221, and the other end has a second pivotal connection part 222.

As shown in FIGS. 2 and 3, the float 3 is located right underneath the base 22 and inside the chamber 11. The surrounding wall 10 functions as a guiding portion. The top of the float 3 has a third pivotal connection part 30 on the same side as the first pivotal connection part 221. The third pivotal connection part 30 has a long groove 300 through from both sides.

As shown in FIGS. 2 and 3, the linkage set in this embodiment includes a first link bar 5 and a second link bar 6. The first link bar is above the base 22 and pivotally connected to the first pivotal connection part 221 on one end. One end of the second link bar 6 extends via the two long holes 220 to above the base 22 and is pivotally connected to the second pivotal connection part 222. The ends of the first link bar 5 and the second link bar 6 at the second the pivotal connection part 222 are pivotally connected together. The end of the second link bar 6 below the base 22 can slide horizontally within the long groove 300 of the third pivotal connection part 30.

As shown in FIGS. 2 and 3, the sealing plug 4 is mounted on the end of the first link bar 5 at the first pivotal connection part 221. The sealing plug 4 is right underneath the water inlet 21. One end of the second link bar 6 is driven by the longitudinal motion of the float 3 to swing along the long groove 300 of the third pivotal connection part 30. The first link bar 5 is driven to swing and displace the sealing plug 4 longitudinally. The sealing plug 4 rises to block the water inlet 21, preventing water from flowing into the container 1. On the other hand, when a pet drinks water and lowers the water level, the float 3 drops to pull the second link bar 6 and the first link bar 5. The sealing plug 4 lowers and retreats from the water inlet 21, achieving the effect of automatic water replenishment.

An advantage of the invention is the following. The water injection element 2 is above the float 3. The two are connected via the first link bar 5 and the second link bar 6. As the float 3 moves, its relative distance to the water injection element 2 only changes in the longitudinal direction. Therefore, the required space is simply the longitudinal depth of water inside the container 1. The transverse space of the swing arm 92 and the float 93 in a conventional pet drinking fountain can be neglected. In comparison with the prior art, the invention allows more space for water in the container of the same size. This reduction in size also enables smaller containers to use the disclosed auto water replenishing mechanism, enjoying the same function of automatic water replenishment.

Besides, the base 22 and the float 3 are connected via the linage set. Therefore, the pushing force imposed on the sealing plug 4 is better than the case with a single link bar. It overcomes the problem associated with different water pressures in different regions. In other words, even if water pressure varies, the linkage set still enables the sealing plug 4 to have sufficient pushing force to block the water inlet 21 of the water injection element 2.

Figure 4:
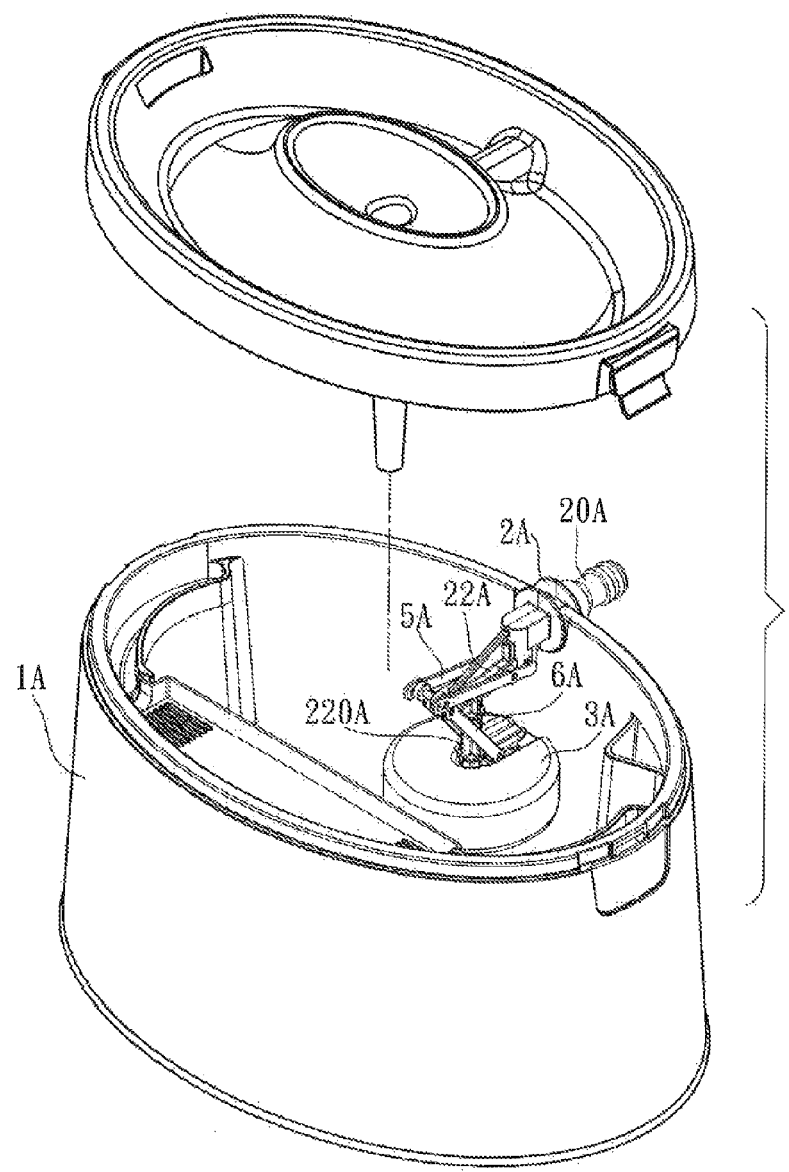
FIG. 4 is a three-dimensional view of the second embodiment of the auto water replenishing mechanism in a pet drinking fountain.

Of course, the invention has many other embodiments that only differ in details. Please refer to FIGS. 4 to 7 for a second embodiment of the invention. As shown in FIG. 4, it is installed in a container 1A which in this embodiment is a small bowl. The auto water replenishing mechanism in this embodiment includes a water injection element 2A, a float 3A, a sealing plug 4A, and a linkage set.

Figure 5:
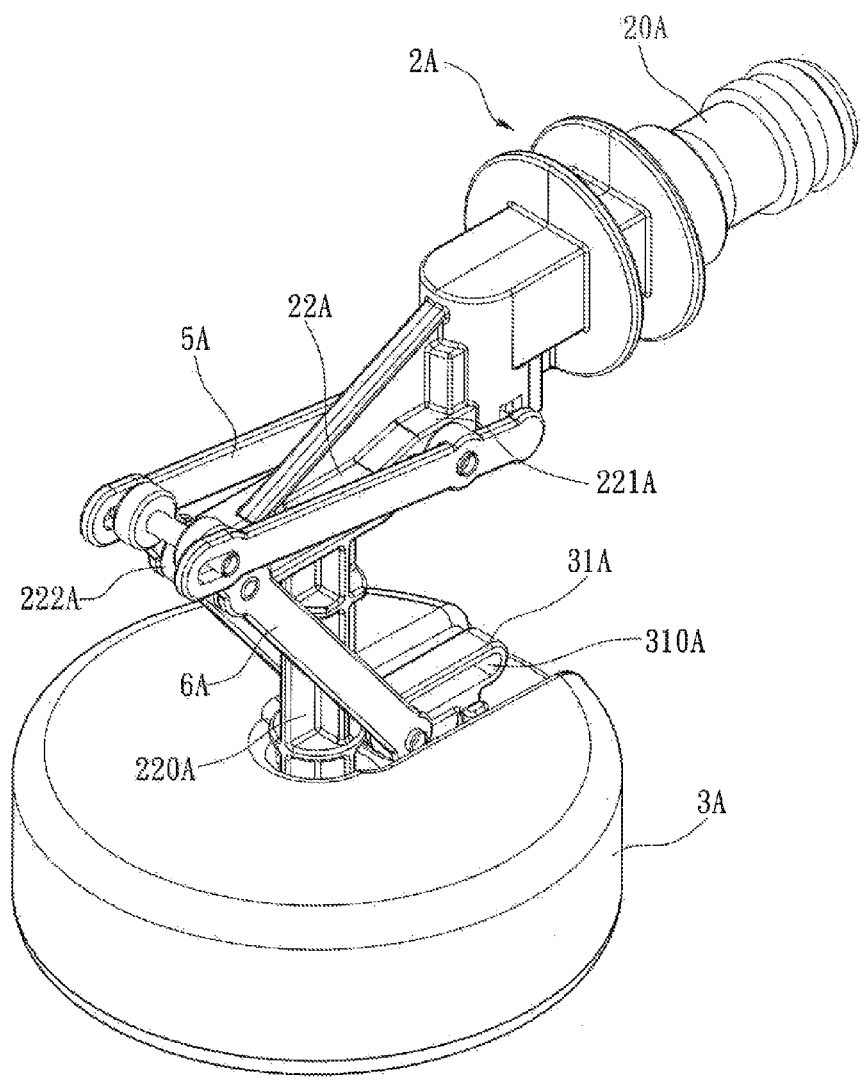
FIG. 5 is a three-dimensional view of the second embodiment of the invention, showing the base, the float, the sealing plug, and the linkage set of the auto water replenishing mechanism.
Figure 6:
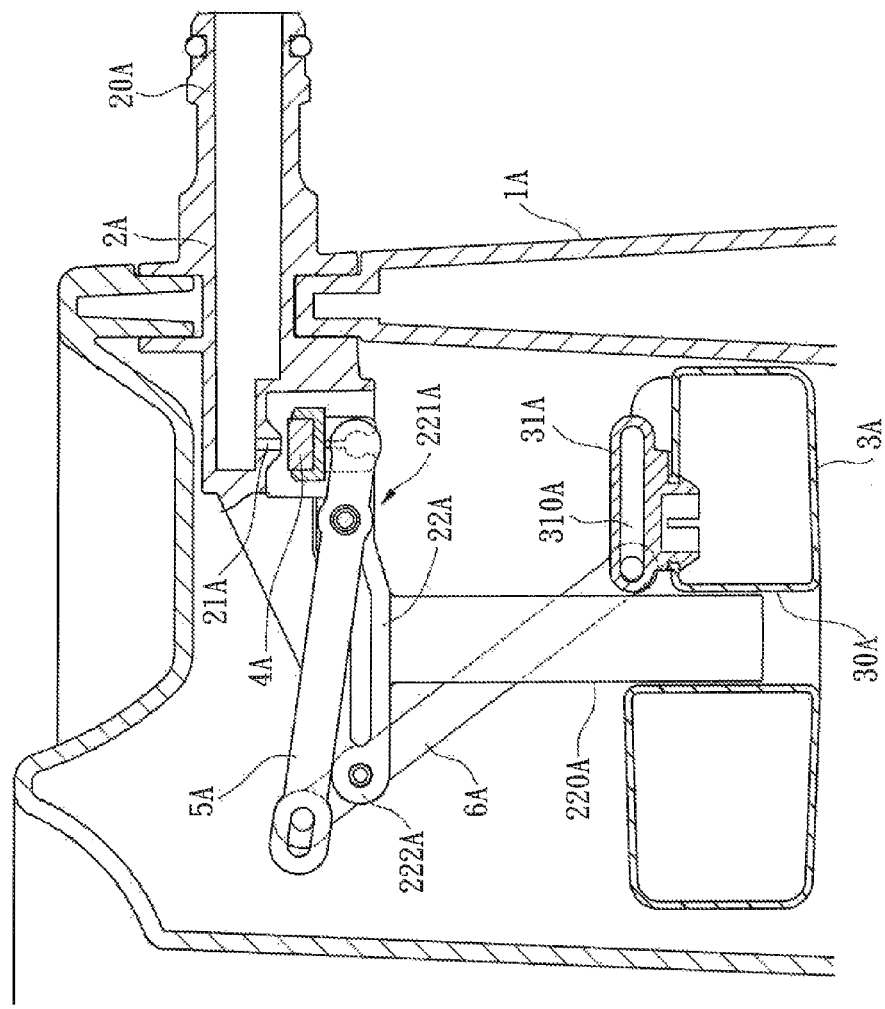
FIG. 6 is a schematic cross-sectional view of the auto water replenishing mechanism in the second embodiment, showing that the sealing plug retreats from the water inlet for water replenishment as the float drops.

As shown in FIGS. 5 and 6, a water outlet 20A of the water injection element 2A is connected in tandem with a base 22A. The bottom of the base 22A has a standing post 220A, both sides of which are formed with a first pivotal connection part 221A and a second pivotal connection part 222A. The first pivotal connection part 221A is closer to the water outlet 20A, while the second pivotal connection part 222A is farther from the water outlet 20A.

As shown in FIGS. 5 and 6, the float 3A is right underneath the base 22A. The center of the float 3A has a through hole 30A for the standing post 220A to go in. The standing post 220A in this embodiment is the guiding portion of the float 3A. The top of the float 3A has a third pivotal connection part 31A on the same side as the first pivotal connection part 221A. The third pivotal connection part 31A has a long groove 310A through from both sides.

As shown in FIGS. 5 and 6, the linkage set of this embodiment includes a first link bar 5A and a second link bar 6A. One end of the first link bar 5A pivotally connects to the first pivotal connection part 221A. One end of the second link bar 6A pivotally connects to the second pivotal connection part 222A. The other end of the second link bar 6A can horizontally slide within the long groove 310A of the third pivotal connection part 31A. The ends of the first link bar 5A and the second link bar 6A at the second pivotal connection part 222A are pivotally connected together.

Figure 7:
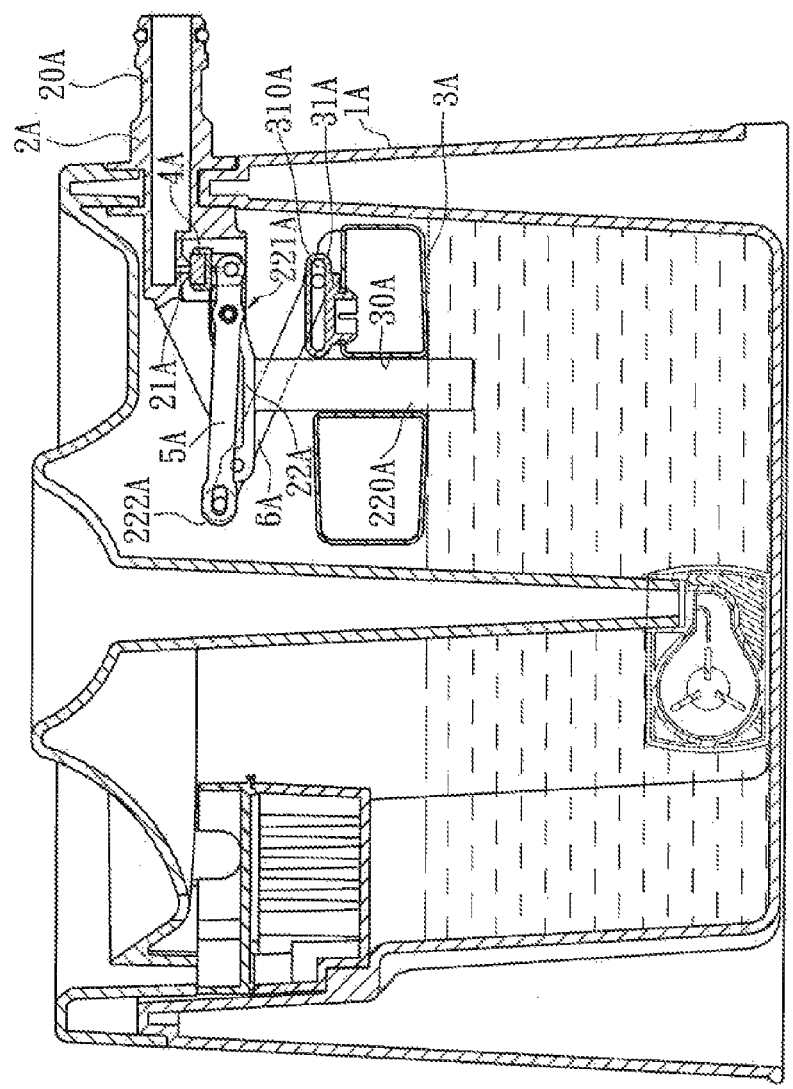
FIG. 7 is a schematic cross-sectional view of the auto water replenishing mechanism in the second embodiment, showing that the sealing plug blocks the water inlet as the float rises.

As shown in FIGS. 6 and 7, the sealing plug 4A is mounted on the end of the first link bar 5A toward the first pivotal connection part 221A. The sealing plug 4A is right underneath the water inlet 21A. One end of the second link bar 6A is driven to swing within the long groove 310A of the third pivotal connection part 31A by the longitudinal motion of the float 3A. The first link bar 5A is driven to swing, pushing the sealing plug 4A to move longitudinally. The sealing plug 4A thus rises to block the water inlet 21A, preventing water from flowing into the container 1A. On the other hand, as a pet drinks water to lower the water level, the float 3A drops to pull the second link bar 6A and the first link bar 5A. The sealing plug 4A lowers and retreats from the water inlet 21A, achieving the effect of automatic water replenishment.

The auto water replenishing mechanism in this embodiment differs from the first embodiment in various components. However, it shares some common features as the first embodiment. That is, this embodiment also has the water injection element 2A above the float 3A. The base 22A and the float 3A are also connected via the linkage set, thereby achieving the same effect as the first embodiment.

Figure 8:
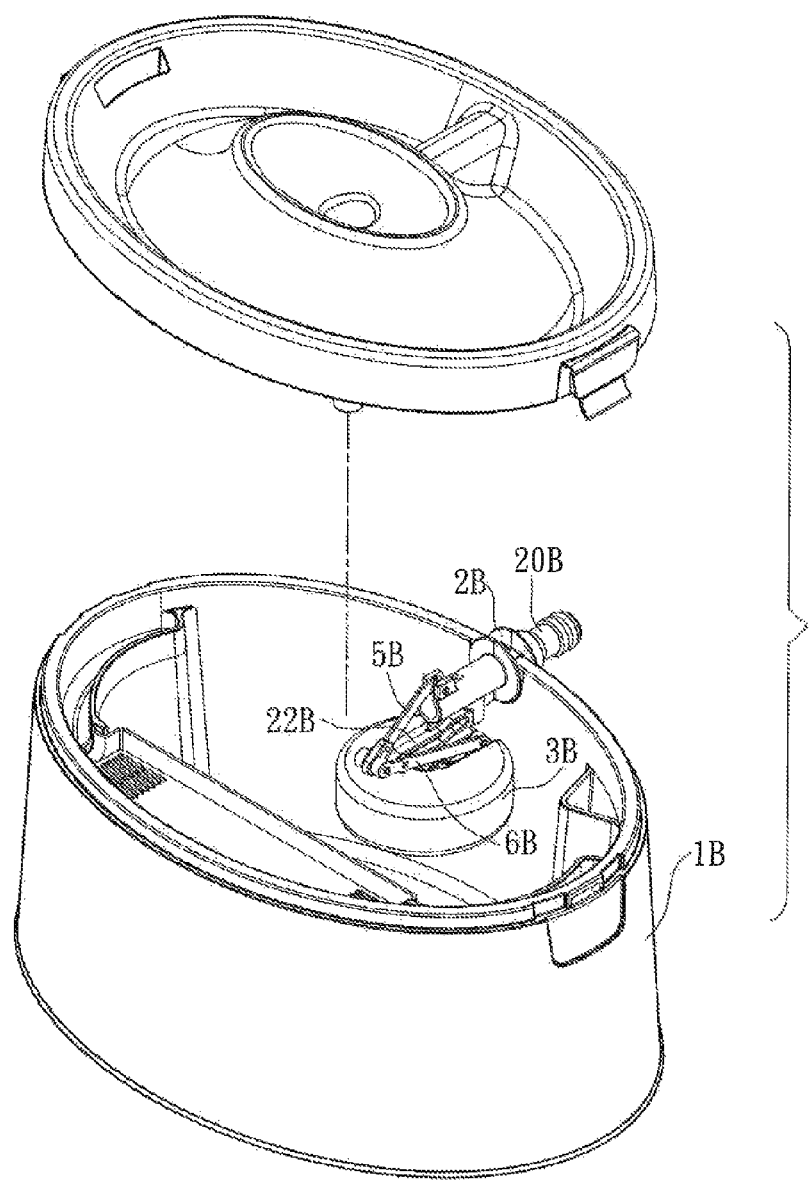
FIG. 8 is a three-dimensional view of the third embodiment of the auto water replenishing mechanism in a pet drinking fountain.

Please refer to FIGS. 8 to 11 for a third embodiment of the invention. As shown in FIG. 8, it is installed in a container 1B which is also a small bowl as in the second embodiment. The auto water replenishing mechanism in this embodiment includes: a water injection element 2B, a float 3B, a sealing plug 4B, and a linkage set.

Figure 9:
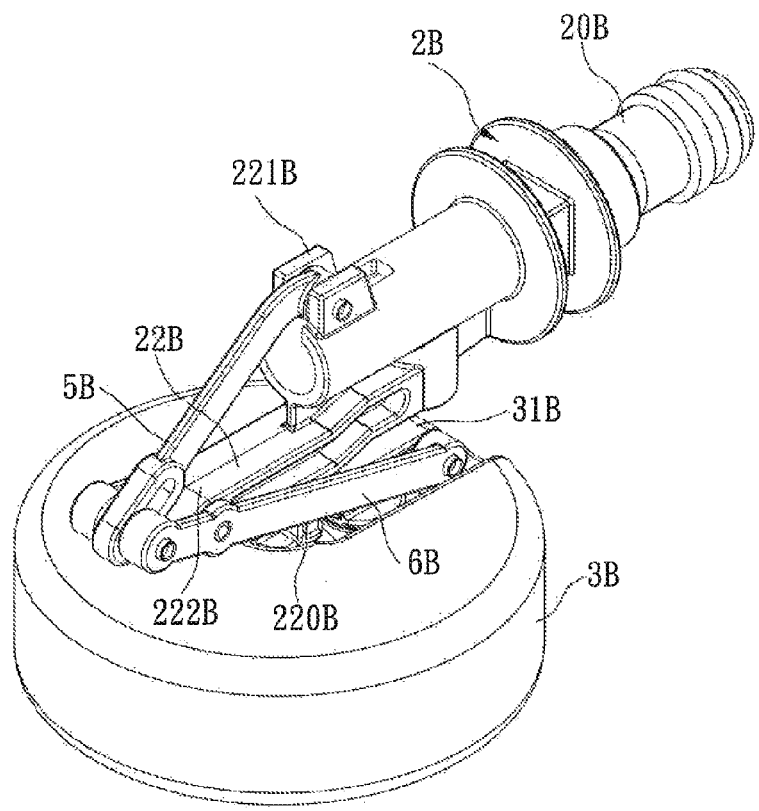
FIG. 9 is a three-dimensional view of the third embodiment of the invention, showing the base, the float, the sealing plug, and the linkage set of the auto water replenishing mechanism.
Figure 10:
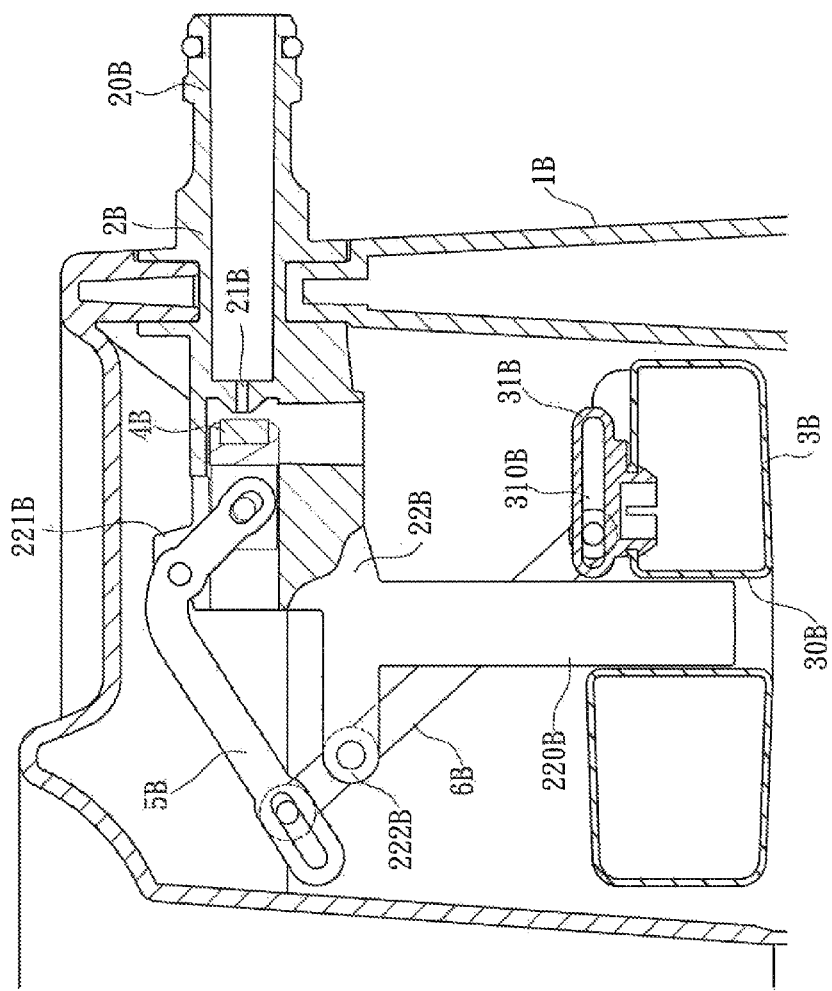
FIG. 10 is a schematic cross-sectional view of the auto water replenishing mechanism in the third embodiment, showing that the sealing plug retreats from the water inlet for water replenishment as the float drops.

As shown in FIGS. 9 and 10, a water outlet 20B of the water injection element 2B is connected with a base 22B in tandem. The bottom of the base 22B has a standing post 220B, both sides of which are formed with a first pivotal connection part 221B and a second pivotal connection part 222B. The first pivotal connection part 221B is closer to the water outlet 20B, while the second pivotal connection part 222B is farther from the water outlet 20B.

As shown in FIGS. 9 and 10, the float 3B is right underneath the base 22B. The center of the float 39 has a through hole 30B for the standing post 220B to enter. The standing post 220B in this embodiment is the guiding portion of the float 3B. The top of the float 3B has a third pivotal connection part 31B on the same side as the first pivotal connection part 221B. The third pivotal connection part 31B has a long groove 310B through on both sides.

As shown in FIGS. 9 and 10, this embodiment has a first link bar 5 whose one end pivotally connects to the first pivotal connection part 221B and a second link bar 6 whose one end pivotally connects to the second pivotal connection part 222B. The other end of the second link bar 6B can slide horizontally within the long groove 310B of the third pivotal connection part 31B. The ends of the first link bar 5B and the second link bar 6B at the second pivotal connection part 222B are pivotally connected together.

Figure 11:
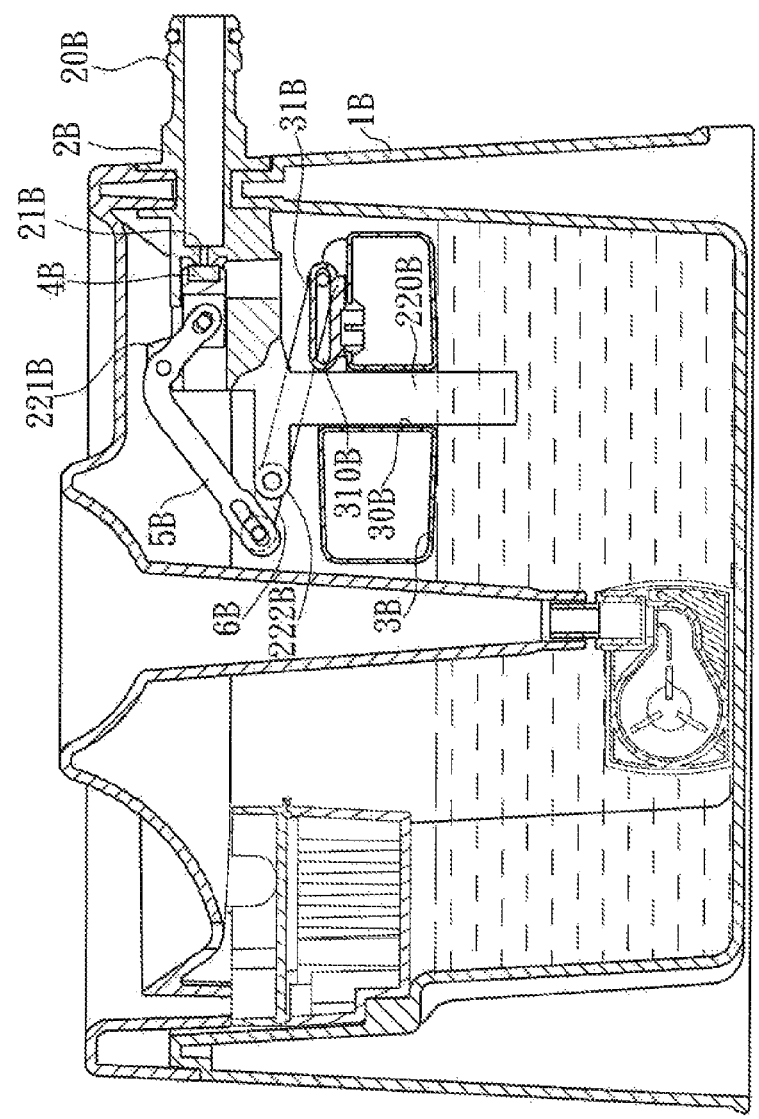
FIG. 11 is a schematic cross-sectional view of the auto water replenishing mechanism in the third embodiment, showing that the sealing plug blocks the water inlet as the float rises.
Figure 12:
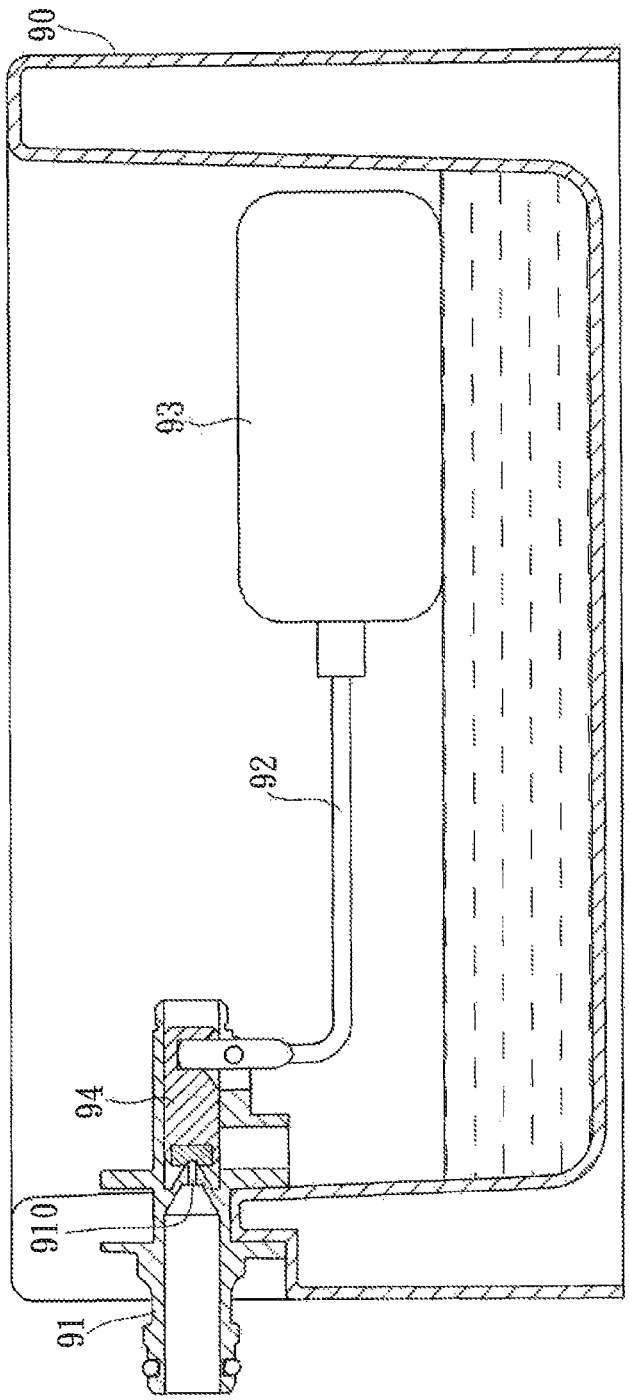
FIG. 12 is a schematic cross-sectional view of a conventional auto water replenishing mechanism for a pet drinking fountain.

As shown in FIGS. 10 and 11, the sealing plug 4B is mounted on the end of the first link bar 5B toward the first pivotal connection part 221B. The sealing plug 4B is on a side of the water inlet 21B. One end of the second link bar 6B is driven to swing within the long groove 310B of the third pivotal connection part 31B by the longitudinal motion of the float 3B. The first link bar 5B is driven to swing, thereby driving the sealing plug 4B to move transversely. The sealing plug 4B thus moves sideways to block the water inlet 21B, preventing water from flowing into the container 1B. On the other hand, as a pet drinks water to lower the water level, the float 3B drops to pull the second link bar 6B and the first link bar 5B. The sealing plug 4B then moves sideways and retreats from the water inlet 21B, achieving the effect of automatic water replenishment.

Although the auto water replenishing mechanism in this embodiment differs from the first and second embodiments in various components, it shares the following common features. This embodiment also has the water injection element 2B above the float 3B. The base 22B and the float 3B are connected via the linkage set as well. This embodiment still achieves the same effect as the first and second embodiments.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. An auto water replenishing mechanism for a pet drinking fountain for installation in a container filled with water for a pet, comprising:

a water injection element installed in the container and exposed from a water outlet connected to a water source, and having a water inlet for injecting water into the container and a base;

a float disposed under the water inlet of the water injection element and limited by a guiding portion to float longitudinally on water;

a linkage set composed of at least two link bars, including a first link bar and a second link bar, pivotally connected on two ends and linking between the base and the float; and a sealing plug mounted on the first link bar in the vicinity of the water inlet of the water injection element;

wherein when water level rises, the float floats to swing the first link bar and drive the sealing plug; when the float floats to a predetermined level, the sealing plug is driven to block the water inlet, preventing water from further flowing into the container; when a pet drinks water and lowers the water, level, the float sinks from the predetermined level to swing the first link bar and retreat the sealing plug from the water inlet, thereby automatically replenishing water;

wherein the water injection element is installed at an upward opening of a chamber enclosed by a surrounding wall of the container; the base has two long holes on two opposite sides, one end of each of the long holes has a first pivotal connection part and the other end has a second pivotal connection part; the float is right underneath the base in the chamber, using the surrounding wall as a guiding portion thereof, having a third pivotal connection part on the top thereof and on the same side as the first pivotal connection part, and having a long groove through on both sides; the first link bar being above the base and connecting to the first pivotal connection part on one end, one end of the second link bar extending via the two long holes to above the base and connecting to the second pivotal connection part, ends of the first link bar and the second link bar at the second pivotal connection part pivotally connecting together, and the end of the second link bar under the base being pivotally installed in the long groove of the third pivotal connection part to slide horizontally; and the sealing plug is mounted on the end of the first link bar toward the first pivotal connection part and right underneath of the water inlet; one end of the second link bar is driven to swing in the long groove of the third pivotal connection part by the longitudinal motion of the float, enabling the first link bar to swing and drive the sealing plug to move longitudinally, so that the sealing plug rises to block the water inlet or drops and retreats from the water inlet for water replenishment.

\* \* \* \* \*